June 12, 1934.  T. A. BRUNT  1,962,231
WEIGHING MACHINE
Filed Jan. 10, 1929
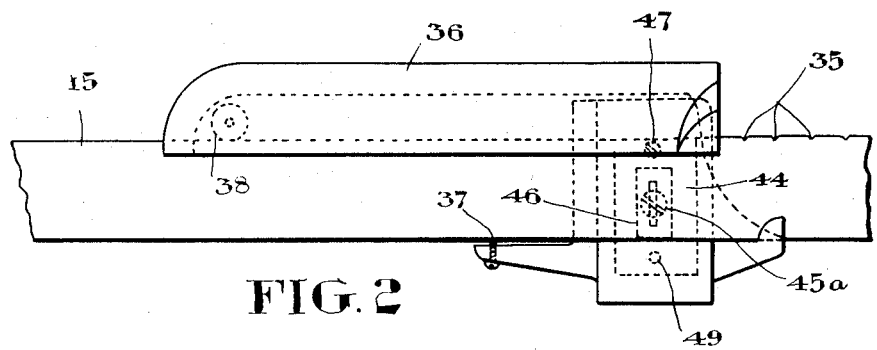
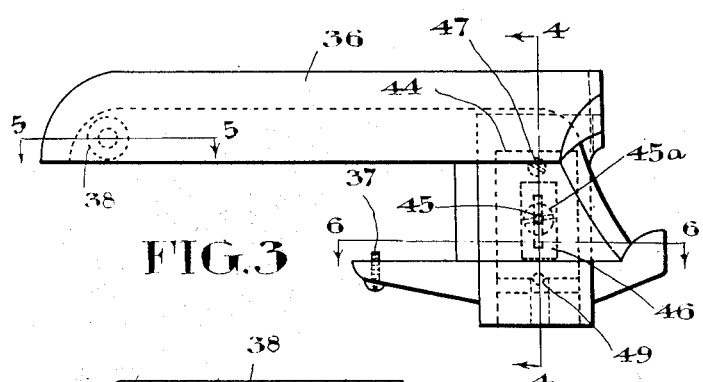
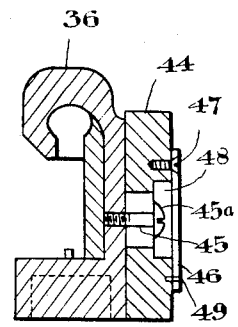
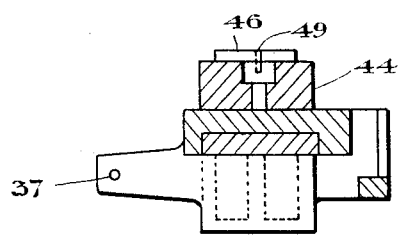
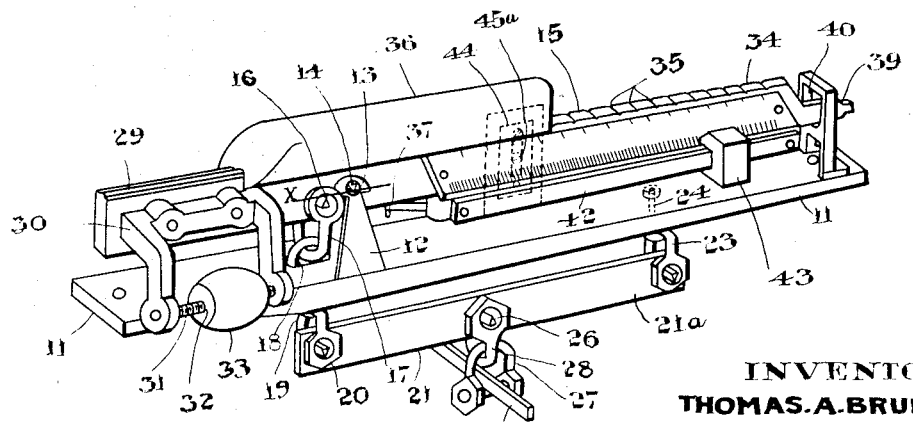
INVENTOR
THOMAS. A. BRUNT
BY Fetherstonhaugh &Co
ATTORNEYS Patented June 12, 1934

1,962,231

UNITED STATES PATENT OFFICE 1,962,231

WEIGHING MACHINE

Thomas Arthur Brunt, Renfrew, Ontario, Canada

Application January 10, 1929, Serial No. 331,617

2 Claims. (Cl. 265—49)

This invention relates to new and useful improvements in weighing machines and particularly to the balancing mechanism therefor and the object of the invention is to provide means which will allow very fine adjustments to be made to the balancing mechanism with the minimum amount of labour during assembly of the weighing machine and also while making repairs or adjustments to same.

According to my invention, I provide a bar scale of the usual type having a sliding weight or weights which are adapted to weigh loads from zero up to a predetermined amount. My improvement lies in providing an auxiliary weight which is adjustable on one of the poise weights to bring the center of gravity of the poise weight above or below a horizontal line drawn through the balance lever pivot and the weight suspension pivot so that by proper location of the auxiliary weight the sensitivity of the weighing bar may be predetermined for all positions of the poise weight.

In the drawing which illustrates one form of my invention,

Figure 1 is a perspective view of one form of my invention applied to a double bar scale of a weighing machine.

Figure 2 is an enlarged view of the large weight shown in Figure 1 and its attachment to the weighing bar.

Figure 3 is a front elevation of the weight.

Figure 4 is a sectional end elevation taken on the line 4—4 Figure 3.

Figure 5 is a part sectional plan taken on the line 5—5 Figure 3.

Figure 6 is a sectional plan taken on the line 6—6 Figure 3.

Referring more particularly to the drawing, 11 designates the base plate which is provided with upwardly extending bearings 12, having pivot centres 13 formed therein to receive the balance pivots 14 of the weighing bar 15. Extending outwardly from the weighing bar in close proximity to the pivots 14 are the weighing pivots 16 from which are suspended the shackle 17, the link 18 and the shackle 19. The shackle 19 is pivotally secured to one end 20 of a balance bar 21, the other end 21a of which is secured by a shackle 23 and bolt 24 to the base plate. The weighing bar 25 of the scale is secured to a point 26 intermediate the ends of the bar 21 by means of the shackles 27 and 28. The weighing bar 15 has an extension 29 and secured thereto is the bracket 30 having mounted therein a threaded screw 31 adapted to engage with the threaded aperture 32 of the adjustable weight 33. The weighing bar 15 on the end 34 is provided with a series of equally spaced recesses 35 which serve as stops for the point of the weight 36. These recesses indicate predetermined weights and the bar may be marked in any suitable manner to facilitate the reading of the weighing bar or scale. The sliding weight may be of any desired type but in the drawing it is shown of the hooked type adapted to embrace the bar 15 which is grooved to receive the upwardly extending pin 37. A roller 38 may also be positioned at one end of the weight to facilitate its movement along the bar. The pin 37 holds the weight on the bar 15 and acts as a stop to prevent the weight from being lifted high enough to become detached from the bar. The weighing end 39 of the weighing bar fits into a slotted stop 40 secured to the base plate or fulcrum support, 11. A smaller bar 42 may be secured to or formed integral with the main bar and slidably mounted thereon is the small weight 43. The small weight slides the full length of the smaller bar which is marked in any suitable manner to indicate from zero to a weight equivalent to the weighing value of the space between the recesses in the main bar. The combination of weights allows accurate readings to be made for the full capacity of the scale or weighing machine.

My improvement lies in providing an auxiliary weight 44 which is slotted vertically and is attached to the main weight 36 by means of the screw 45. The auxiliary weight is recessed to accommodate the head 45a of the screw 45 and a plate 46 is secured to the weight by means of the screw 47 and adapted to cover the recess 48 to prevent unauthorized persons from tampering with the screw after the adjustments have been made to the scale. A dowel pin 49 may be secured to the plate to prevent same from turning on the screw 47.

The scale described is only illustrative of one type to which my improvement may be attached and modifications may be made thereto without departing from the spirit of the invention.

In operation loads laid on the weighing platform not shown are adapted to exert a pull on the balance bar, which is connected to the main bar and by moving the smaller and the main weight along their respective bars accurate readings of the weight of the load may be obtained. The movement of the small weight is so arranged that readings in small increments up to a predetermined weight may be obtained while the movement of the large or main weight is such that it is in multiples of the total weighing capacity of the smaller bar. The balance of the weighing bar may be quickly arrived at by moving the weight on the screw at the balance end of the bar. The auxiliary weight on the main weight is adjusted vertically to bring the centre of gravity either above or below a horizontal line X drawn through the pivotal axis 13 of the main weighing bar and the pivotal axis 16 of the load supporting shackle 17. During initial setting of the scale the auxiliary weight is adjusted vertically on the main weight to bring the center of gravity of the combined main and auxiliary weights above or below the line X so as to control the sensitivity of the weighing bar for all positions of the main and auxiliary weights which constitute the movable poise. This adjustment serves the same purpose as the previous operation of altering the position of the pivot points when setting the machine to control the sensitivity of the weighing bar and is of advantage over such prior operation in that it provides for quicker and more accurate adjustment. When the scale is to be used for weighing very heavy loads, the auxiliary weight will be preferably adjusted on the main weight to bring the center of gravity of the weights below the line X since, with this adjustment of the weights, the weighing bar vibrates slightly until it assumes a substantially horizontal position when in use.

What I claim is:

1. In a weighing machine, a weighing bar, a main weight slidably mounted thereon, a fulcrum pivot in said bar, a suspension pivot in the bar and an auxiliary weight secured to the main weight to allow relative vertical adjustments to be made between the weights to bring the centre of gravity of the combined weights above or below a line passing through the pivots.

2. In a weighing machine, a weighing bar, a main weight slidably mounted on the bar, horizontally spaced pivots on said bar, an auxiliary weight fitted in a recess formed in one side of the main weight and having a vertical slot formed therein, attaching means passing through said slot and into the main weight, means covering the recess to protect the attaching means.

THOMAS ARTHUR BRUNT.